(12) United States Patent
Mandavilli et al.

(10) Patent No.: US 8,929,225 B2
(45) Date of Patent: Jan. 6, 2015

(54) CUSTOMER EDGE DEVICE PROBLEM IDENTIFICATION

(71) Applicant: Hewlett-Packard Development Company, L.P., Houston, TX (US)

(72) Inventors: Swamy Jagannadha Mandavilli, Fort Collins, CO (US); Anuradha Venkataraman, Bangalore (IN); Kotilingareddy Bhavanam, Bangalore (IN); Muthukumar Suriyanarayanan, Bangalore (IN); Venkatesh Mahalingam, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 13/707,696

(22) Filed: Dec. 7, 2012

(65) Prior Publication Data

US 2014/0160942 A1 Jun. 12, 2014

(51) Int. Cl.
*H04L 12/26* (2006.01)
*H04L 12/24* (2006.01)

(52) U.S. Cl.
CPC ........ *H04L 43/0811* (2013.01); *H04L 41/0659* (2013.01); *H04L 41/0654* (2013.01); *H04L 41/0695* (2013.01); *H04L 41/0645* (2013.01)
USPC ........................... 370/242; 370/216; 370/229

(58) Field of Classification Search
None
See application file for complete search history.

(56) References Cited

U.S. PATENT DOCUMENTS

| | | | | |
|---|---|---|---|---|
| 5,559,958 A | * | 9/1996 | Farrand et al. | 714/27 |
| 5,774,669 A | * | 6/1998 | George et al. | 709/224 |
| 5,864,865 A | * | 1/1999 | Lakis | 1/1 |
| 6,176,883 B1 | * | 1/2001 | Holloway et al. | 709/223 |
| 6,212,511 B1 | * | 4/2001 | Fisher et al. | 1/1 |
| 6,286,040 B1 | * | 9/2001 | Durham et al. | 709/221 |
| 6,574,664 B1 | * | 6/2003 | Liu et al. | 709/224 |
| 6,611,866 B1 | * | 8/2003 | Goldman | 709/224 |
| 6,681,232 B1 | * | 1/2004 | Sistanizadeh et al. | 1/1 |
| 6,950,864 B1 | * | 9/2005 | Tsuchiya | 709/223 |
| 7,003,564 B2 | * | 2/2006 | Greuel et al. | 709/224 |
| 7,472,183 B1 | * | 12/2008 | Dini et al. | 709/224 |
| 7,516,212 B2 | * | 4/2009 | Nguyen et al. | 709/224 |
| 7,548,965 B2 | * | 6/2009 | Babu | 709/223 |
| 7,693,975 B2 | * | 4/2010 | Sanchez | 709/223 |
| 7,974,219 B2 | * | 7/2011 | Strahan et al. | 370/254 |
| 7,983,153 B2 | | 7/2011 | Filsfils et al. | |

(Continued)

OTHER PUBLICATIONS

Foschini, L., "A Distributed Approach to Topology Discovery in Grid Environment," Sep. 19, 2012, 47 pages.

*Primary Examiner* — Bunjob Jaroenchonwanit
(74) *Attorney, Agent, or Firm* — Brooks, Cameron & Huebsch, PLLC; Mary Katherine Thueringer (57) ABSTRACT

Systems, methods, and machine-readable and executable instructions are provided for customer edge device problem identification. Customer edge device problem identification can include obtaining a status of a connection between a provider edge (PE) device and a customer edge (CE) device. Customer edge device problem identification can also include determining whether the status of the connection is non-normal. Customer edge device problem identification can include sending an internet control message protocol (ICMP) echo request to the CE device in response to the status of the connection being non-normal. Customer edge device problem identification can include receiving an ICMP echo response from the CE device. Customer edge device problem identification can also include identifying a simple network management protocol (SNMP) problem that is associated with the CE device based upon the receipt of the ICMP echo response.

15 Claims, 4 Drawing Sheets

(56) References Cited

U.S. PATENT DOCUMENTS

| | | | |
|---|---|---|---|
| 7,983,174 B1* | 7/2011 | Monaghan et al. | 370/242 |
| 8,185,658 B2 | 5/2012 | Vohra et al. | |
| 8,352,600 B2* | 1/2013 | Calippe et al. | 709/225 |
| 8,472,346 B1* | 6/2013 | Bahadur et al. | 370/254 |
| 8,522,232 B1* | 8/2013 | Carter et al. | 717/173 |
| 2002/0161879 A1* | 10/2002 | Richard | 709/223 |
| 2003/0018829 A1* | 1/2003 | Carney et al. | 709/321 |
| 2003/0046381 A1* | 3/2003 | Mokuya et al. | 709/223 |
| 2003/0101236 A1* | 5/2003 | Ohara | 709/218 |
| 2003/0204619 A1* | 10/2003 | Bays | 709/238 |
| 2003/0214905 A1* | 11/2003 | Solomon et al. | 370/229 |
| 2004/0153835 A1* | 8/2004 | Song et al. | 714/38 |
| 2004/0230692 A1* | 11/2004 | Tachiyama et al. | 709/230 |
| 2005/0020265 A1* | 1/2005 | Funabiki et al. | 455/436 |
| 2005/0147051 A1* | 7/2005 | Suri | 370/249 |
| 2006/0015607 A1* | 1/2006 | Fava et al. | 709/224 |
| 2006/0026267 A1* | 2/2006 | Godin et al. | 709/220 |
| 2006/0029035 A1 | 2/2006 | Chase et al. | |
| 2006/0215580 A1* | 9/2006 | Iinuma | 370/254 |
| 2007/0050498 A1* | 3/2007 | Claise | 709/224 |
| 2007/0100871 A1* | 5/2007 | Clemm et al. | 707/102 |
| 2007/0124362 A1* | 5/2007 | Kren | 709/202 |
| 2007/0192448 A1* | 8/2007 | Sankaran | 709/220 |
| 2007/0242303 A1* | 10/2007 | Barry et al. | 358/1.15 |
| 2008/0181219 A1 | 7/2008 | Chen et al. | |
| 2008/0189446 A1* | 8/2008 | Pulpatta et al. | 710/15 |
| 2009/0003223 A1* | 1/2009 | McCallum et al. | 370/244 |
| 2009/0144411 A1* | 6/2009 | Winkler et al. | 709/224 |
| 2010/0094997 A1* | 4/2010 | Chou | 709/224 |
| 2010/0260066 A1* | 10/2010 | August et al. | 370/254 |
| 2010/0293400 A1* | 11/2010 | Kuroishi et al. | 713/310 |
| 2011/0138030 A1* | 6/2011 | Clemm et al. | 709/223 |
| 2011/0219102 A1* | 9/2011 | Sankaran | 709/221 |
| 2011/0286447 A1* | 11/2011 | Liu | 370/389 |
| 2011/0295989 A1* | 12/2011 | Kiyoto | 709/223 |
| 2012/0008528 A1 | 1/2012 | Dunbar et al. | |
| 2012/0243410 A1* | 9/2012 | Vedula et al. | 370/235 |
| 2012/0251113 A1* | 10/2012 | Hajduczenia et al. | 398/66 |
| 2012/0254828 A1* | 10/2012 | Aiylam et al. | 717/104 |
| 2013/0031033 A1* | 1/2013 | Prieditis | 706/12 |
| 2013/0339991 A1* | 12/2013 | Ricci | 725/14 |
| 2014/0029441 A1* | 1/2014 | Nydell | 370/241.1 |
| 2014/0029442 A1* | 1/2014 | Wallman | 370/241.1 |
| 2014/0168297 A1* | 6/2014 | Thacker et al. | 347/7 |

* cited by examiner

CUSTOMER EDGE DEVICE PROBLEM IDENTIFICATION

BACKGROUND

An Internet service provider (ISP) can provide internet services to a number of devices. An ISP can allow the number of devices to connect with each other using a number of protocols. The number of devices can be located at a number of locations. The number of devices can share information with each other through the ISP.

DETAILED DESCRIPTION

An enterprise can be comprised of a number of customer edge (CE) devices that can be physically located at a number of sites. The number of CE devices can be connected to each other through an internet service provider (ISP). The number of CE devices can be accessed from the enterprise. Access to a number of provider edge (PE) devices that connect the number of CE devices to each other and to the enterprise can be denied to devices from the enterprise. A topology of the number of CE devices in the enterprise can be discovered by analyzing a number of autonomous system (AS) numbers that can be associated with the PE devices. Problems that are associated with the CE devices can be identified based on a number of prefixes that are associated with the CE devices.

As used herein, a CE device can include a physical component, e.g., a processor, memory, I/O port, bus, etc, and/or machine readable instructions, e.g., software. A CE device can be used to communicate with an enterprise and/or other CE devices that are part of the enterprise via a PE device. A number of CE devices can be linked, e.g., physical linked and/or logically linked, and can communicate with other CE devices via a virtual private network (VPN). A PE device can include a physical component, e.g., a processor, memory, I/O port, bus, etc, and/or machine readable instructions, e.g., software, that can be used to connect a CE device to an internet service provider (ISP). A number of PE devices can be part of the ISP.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
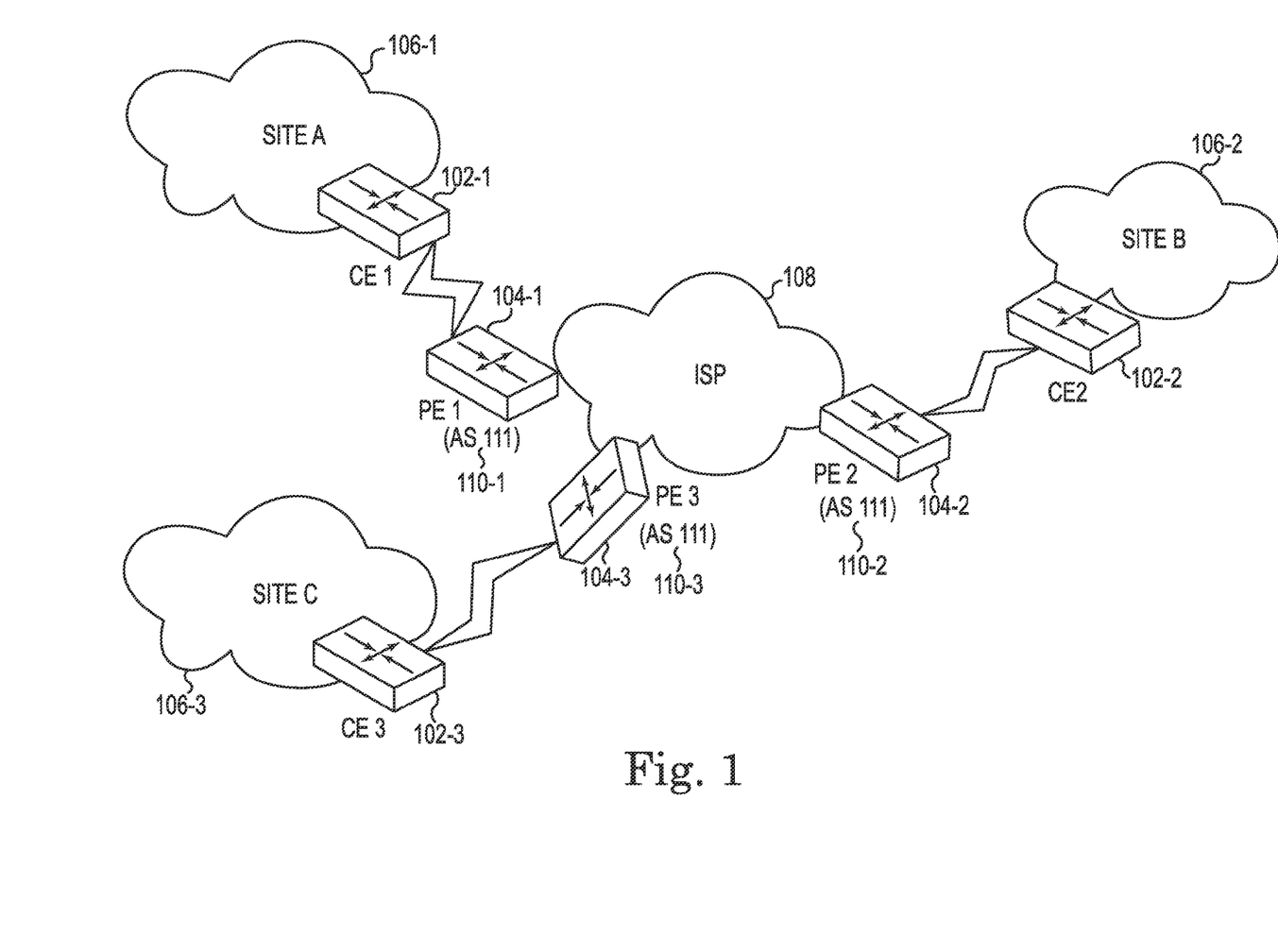
FIG. 1 is a diagram illustrating an example of a number of customer edge devices in a number of sites according to the present disclosure.

FIG. 1 is a diagram illustrating an example of a number of CE devices in a number of sites according to the present disclosure. An enterprise can include a first CE device 102-1, a second CE device 102-2, and/or a third CE device 102-3, e.g., referred to generally as CE devices 102. The enterprise can include more or less CE devices than those illustrated in FIG. 1.

An enterprise can be an organization that supports the CE devices 102. An enterprise can be associated with an enterprise network that can interconnect, through a VPN, the CE devices 102 even though the CE devices are located at different sites. The CE devices 102 can be connected to the enterprise when the CE devices 102 are connected to the enterprise network. A network topology of the CE devices in the enterprise can be created. A network topology can define the relationship between CE devices in the enterprise.

A site can include a physical location that is associated which a CE device. Different sites can include a number of CE devices that are located at different physical locations. For example, a first site 106-1 can be associated with the first CE device 102-1, a second site 106-2 can be associated with the second CE device 102-2, and/or a third site 106-3 can be associated with the third CE devices 102-3. The first site 106-1, the second site 106-2, and/or the third site 106-3 can be physically isolated from each other and can be referred to generally as sites 106.

The CE devices 102 can be physically linked through a first PE device 104-1, a second PE device 104-2, and/or a third PE device 104-2, e.g., referred to generally as PE devices 104. The first PE device 104-1 can be associated with the first CE device 102-1, the second PE device 104-2 can be associated with the second CE device 102-2, and/or the third PE device 104-3 can be associated with the third CE device 102-3. The PE devices 104 can connect the CE devices 102 to an ISP 108 that can be used to connect the CE devices 102 to each other.

In a number of examples, a connection to the CE device 102 can be established from the enterprise through the VPN services of an ISP 108. The ISP 108 can use multi-protocol label switching (MPLS) to provide the VPN services. A simple network management protocol (SNMP) can be used to establish access to the CE devices 102. However, a CE device that is part of the enterprise may have no access to the PE devices 104 and the ISP 108.

The network topology of the CE devices 102 may appear as unconnected when an enterprise initially discovers the network topology of the CE devices 102. The initial network topology can appear as unconnected because the ISP 108 and/or the PE devices 104 cannot be accessed from within the enterprise, e.g., by a CE device that is part of the enterprise. The lack of access can prevent the discovery of a topology of the CE devices 102.

In a number of examples, the CE devices 102 can support a border gateway protocol (BGP). For example, the CE devices 102 can support BGP4. Furthermore, each of the CE devices can be associated with a respective management information base (MIB) that can contain information regarding the CE devices 102 and/or network parameters, among other parameters.

A network topology of the CE devices 102 can be obtained by analyzing a number of AS numbers that are associated with the PE devices 104. For example, a first CE device 102-1 can be a target CE device that can be part of the enterprise. A second CE device 102-2 can be a CE device from which a number of requests can be sent in behalf of the enterprise. A number of requests can be sent to the first CE device 102-1 and/or the third CE device 102-3 from the second CE device 102-2. The second CE device 102-2 can request the value of a bpgPeerRemoteAs MIB object identifier (OID) from the first CE device 102-1 and/or the third CE device 102-3. The bpgPeerRemoteAs OID can be defined as:

```
bgpPeerRemoteAs OBJECT-TYPE
    SYNTAX       INTEGER (0..65535)
    MAX-ACCESS   read-only
    STATUS       current
    DESCRIPTION
        "The remote autonomous system number."
    ::= { bgpPeerEntry 9 }
```

The bpgPeerRemoteAs OID can contain the AS number of the BGP peer, e.g., PE device, to which a CE device is connected. For example, the bpgPeerRemoteAs OID for the first CE device 102-1 can be a first AS number 110-1 that is associated with the first PE device 104-1. In FIG. 1, the first PE device 104-1 can be associated with the first AS number 110-1 that can have a value of 111. The second PE device 104-2 can be associated with a second AS number 110-2 that can have a value of 111. The third PE device 104-3 can be associated with a third AS number 110-3 that can have a value of 111.

The first AS number 110-1, the second AS number 110-2, and/or the third AS number 110-3 can have the same value when the PE devices are associated with the same ISP. The topology of the first CE device 102-1 and the third CE device 102-3 can be identified by the second CE device 102-2 as being connected to each other through the same ISP when the first CE device 102-1 and the third CE device 102-3 share the same AS number. That is, when the first AS number 110-1 and the third AS number 110-3 are equal to each other.

Figure 2:
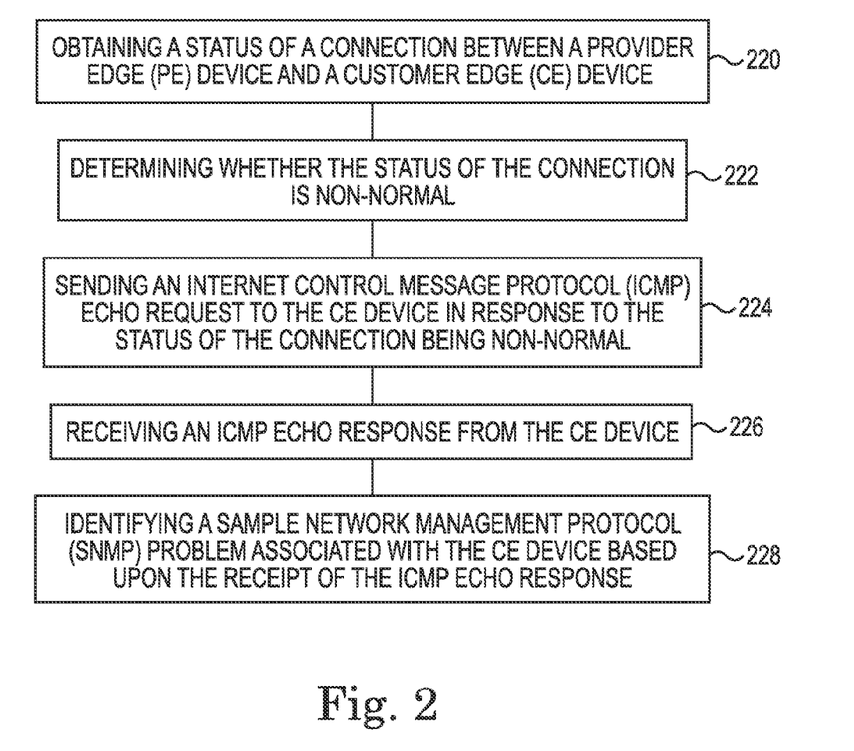
FIG. 2 is a flow chart illustrating an example of a method for customer edge device problem identification according to the present disclosure.
Figure 3:
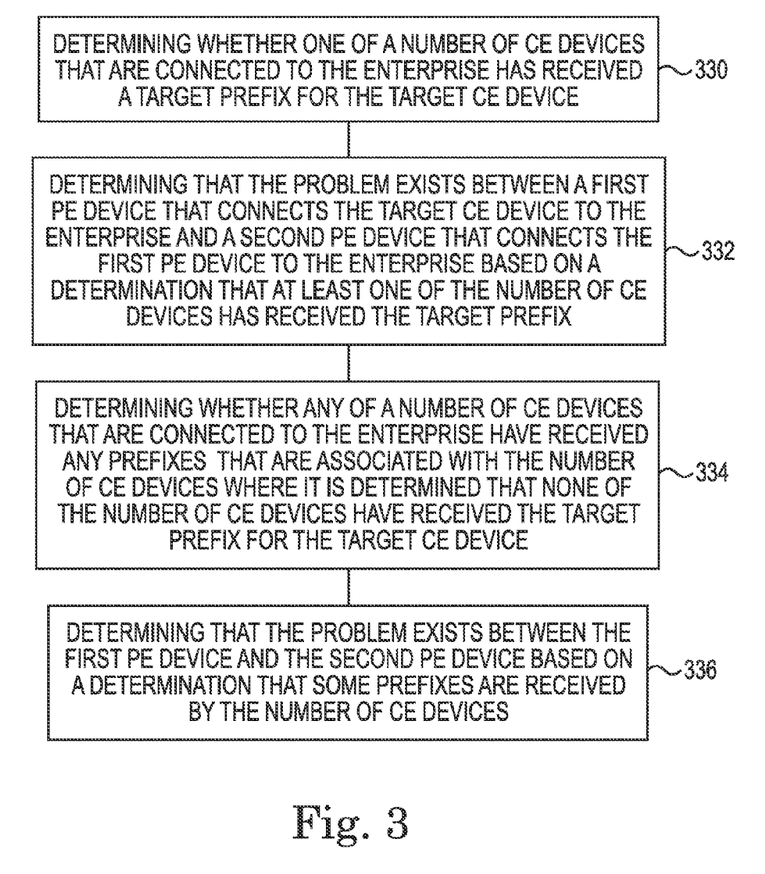
FIG. 3 is a flow chart illustrating an example of a method for customer edge device problem identification according to the present disclosure.

In a number of examples, the second CE device 102-2 can experience a problem when communicating with the first CE device 102-1 and/or the third CE device 102-3. FIG. 2 and FIG. 3 provide examples of diagnosing the problem.

FIG. 2 is a flow chart illustrating an example of a method for customer edge device problem identification according to the present disclosure. At block 220, a status of a connection between a PE device and a CE device can be obtained. For example, the CE device, e.g., target CE device, and the PE device can be analogous to the first CE device 102-1 and the first PE device 104-1 in FIG. 1, respectively.

The status of the connection between the PE device and the CE device can be obtained by querying the CE device for the status of the connection between the CE device and the PE device. The status of the connection can be obtained through a bgpPeerState OID. The bgpPeerState OID can be defined as:

```
bgpPeerState OBJECT-TYPE
    SYNTAX       INTEGER {
        idle(1),
        connect(2),
        active(3),
        opensent(4),
        openconfirm(5),
        established(6)
    }
    MAX-ACCESS   read-only
    STATUS       current
```

```
    DESCRIPTION
        "The BGP peer connection state."
    ::= { bgpPeerEntry 2 }
```

The bgpPeerState can include a syntax that defines the status of a connection, an access to the bgpPeerState OID, a status, and/or a description of the bgpPeerState OID.

At block 222, it can be determined whether the status of the connection is non-normal. The status can be non-normal when bgpPeerState OID identifies the state of the connection as not established and/or when a response to the request is not received from the CE device. Not receiving a response can result when the request is not received by the CE device and/or when the CE device receives the request and does not send a reply.

At block 224, once the status of the connection is identified as non-normal, an internet control message protocol (ICMP) echo request can be sent to the CE device. The echo request can be sent from the enterprise. At block 226, an ICMP echo response can be received from the CE device. At block 228, a SNMP problem can be identified wherein the SNMP problem is associated with the CE device based on the receipt of the ICMP echo response. The SNMP problem can be identified from the enterprise. For example, a second CE device, that is part of the enterprise, can identify an SNMP problem that is associated with a first CE device. The problem can exist within the first CE device, and/or within a connection between a first PE device, that is associated with the first CE device when the ICMP echo response is not received from the first CE device. The problem can also exist within a second PE device, that can be associated with a second CE device, from which the ICMP echo request was sent when the ICMP echo response is not received from the first CE device. The second CE device and the second PE device can be analogous to the second CE device 102-2 and the second PE device 104-2 in FIG. 1, respectively.

FIG. 3 is a flow chart illustrating an example of a method for customer edge device problem identification according to the present disclosure. At block 330, a determination can be made as to whether one of a number of CE devices that are connected to the enterprise has received a target prefix for the target CE device. The target CE device can be analogous to the first CE device 102-1 in FIG. 1.

In a number of examples, the target CE device can advertise its prefix, e.g., (target prefix), to a number of CE devices. Each of the number of CE devices can be analogous to the third CE device 102-3 in FIG. 1. The number of CE devices can report the prefixes that the number of CE devices have learned through an ipCidrRouteTable OID. A request can be sent from an enterprise to the number of CE devices for the target prefix that is associated with the target CE device. The number of CE devices can respond to the request by returning a value for an ipCidrRouteDest OID from an MIB that is associated with each of the number of CE devices. An ipCidrRouteDest OID can be defined as:

```
ipCidrRouteDest OBJECT-TYPE
    SYNTAX       IpAddress
    MAX-ACCESS   read-only
    STATUS       deprecated
    DESCRIPTION
        "The destination IP address of this route.
        This object may not take a Multicast (Class D) address
        value.
```

-continued

```
Any assignment (implicit or otherwise) of an instance of
this object to a value x must be rejected if the bitwise
logical-AND of x with the value of the corresponding
instance of the ipCidrRouteMask object is not equal to
x."
::= { ipCidrRouteEntry 1 }
```

The ipCidrRouteDest OID can contain a prefix for the target CE device. The ipCidrRouteDest OID can include a syntax that defines the prefix, an access to the ipCidrRouteDest OID, a status, and/or a description of the ipCidrRouteDest OID.

At block 332, it can be determined that the problem exists between the first PE device that connects the target CE device to the enterprise and a second PE device that connects the first PE device to the enterprise based on a determination that at least one of the number of CE devices has received the target prefix that can be associated with the target CE device. If it is determined that the number of CE devices do not have the target prefix for the target CE device, then at block 334, it can be determined whether any of the number of CE devices that are connected to the enterprise have received any prefixes that are associated with the number of CE devices.

At block 336, it can be determined that the problem exists between the first PE device and the second PE device based on a determination that some prefixes are received by the number of CE devices. As used in block 336, the received prefixes can be prefixes associated with the number of CE devices and not the prefix associated with the target CE device.

If the number of CE devices do not have any prefixes, then a determination can be made as to whether the target CE device is a hub. If a determination is made that the target CE device is a hub, based on the topology of the number of CE devices and the target CE device, then it can be determined that the problem is in the hub. As used herein, a hub can be a target CE device that established a connection to the number of CE devices such that the CE devices are only connected to the target CE device.

Figure 4:
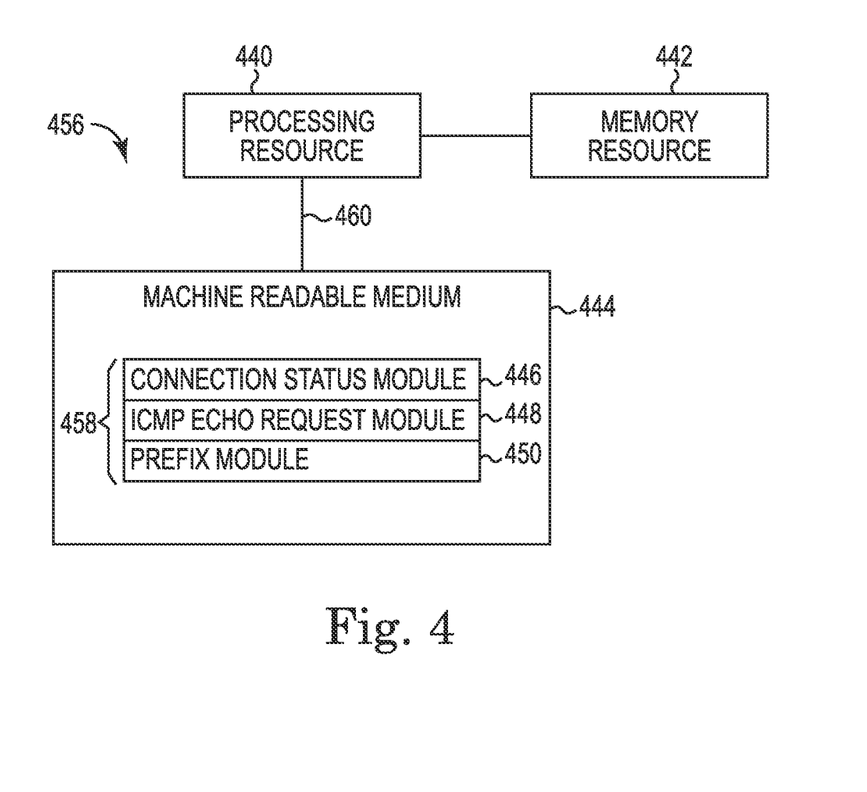
FIG. 4 illustrates an example of a computing system according to the present disclosure.

FIG. 4 illustrates an example of a computing system according to the present disclosure. The computing system 456 can utilize software, hardware, firmware, and/or logic to perform a number of functions.

The computing system 456 can be a combination of hardware and program instructions configured to perform a number of functions (e.g., actions). The hardware, for example, can include one or more processing resources 440, a machine readable medium (MRM) 444, and other memory resources 442, etc. The program instructions, e.g., machine-readable instructions (MRI) 458, can include instructions stored on the MRM 444 to implement a particular function, e.g., an action such as customer edge device problem identification.

The processing resources 440 can be in communication with the tangible non-transitory MRM 444 storing the set of MRI 458 executable by one or more of the processing resources 440, as described herein. The MRI 458 can also be stored in a remote memory (e.g., 442) managed by a server and represent an installation package that can be downloaded, installed and executed. A computing device 456 (e.g., server) can include memory resources 442, and the processing resource 440 can be coupled to the memory resource 442 remotely in a cloud computing environment.

Processing resource 440 can execute MRI 458 that can be stored on internal or external non-transitory MRM 444. The processing resource 440 can execute MRI 458 to perform various functions (e.g., acts), including the functions described with respect to FIG. 1, FIG. 2, and/or FIG. 3, among others.

As shown in FIG. 4, the MRI 458 can be segmented into a number of modules (e.g., a connection status module 446, an ICMP echo request module 448, and a prefix module 450) that when executed by the processing resource 440 can perform a number of functions. As used herein a module includes a set of instructions included to perform a particular task or action. The number of modules 446, 448, and 450 can be sub-modules of other modules. For example, the connection status module 446 and the ICMP echo request module 448 can be sub-modules and/or contained within a single module. Furthermore, the number of modules 446, 448, and 450 can comprise individual modules separate and distinct from one another.

In the example of FIG. 4, a connection status module 446 can comprise MRI 458 that are executed by the processing resource 440 to identify the status of a connection between a first CE device, e.g., target CE device, and a first PE device that can be associated with the first CE device. If a determination that the connection has a non-normal status is made, then an ICMP echo request can be sent from the enterprise.

An ICMP echo request module 448 can comprise MRI 458 that are executed by the processing resource 440 to send an ICMP echo request, e.g., a ping request, to the target CE device. A determination can be made that a problem exists within the SNMP that is associated with the CE device, if an ICMP echo response is received from the target CE device. A determination can be made that a problem exists within the target CE device and/or a connection between the first PE device and a second PE device that is associated with a second CE device from which the ICMP echo request originated.

A prefix module 450 can comprise MRI 458 that are executed by the processing resource 440 to determine whether one of a number of CE devices that are part of the enterprise has a prefix for the target CE device. A determination can be made that a problem exists within the first PE device and the second PE device, if one of the number of CE devices has a prefix for the target CE device. However, if the number of CE devices do not have the prefix for the target CE device, then it can be determined whether the CE devices have any prefixes that are associated with the number of CE devices. If any of the number of CE devices have any prefixes, then the problem can be in the connection between the first PE device and the second PE device. If the number of CE devices do not have any prefixes, then it can be determined that the target CE device is a hub and that the hub is down.

A non-transitory MRM 444, as used herein, can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory MRM 444 can be integral or communicatively coupled to a computing device in a wired and/or wireless manner. For example, the non-transitory MRM 444 can be an internal memory, a portable memory, and a portable disk, or a memory associated with another computing resource, e.g., enabling MRIs 458 to be transferred and/or executed across a network such as the Internet.

The MRM 444 can be in communication with the processing resource 440 via a communication path 460. The communication path 460 can be local or remote to a machine, e.g., a computer, associated with the processing resource 440. Examples of a local communication path 460 can include an electronic bus internal to a machine, e.g., a computer, where the MRM 444 is one of volatile, non-volatile, fixed, and/or removable storage medium in communication with the processing resource 440 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 460 can be such that the MRM 444 is remote from a processing resource, e.g., processing resource 440, such as in a network connection between the MRM 444 and the processing resource, e.g., processing resource 440. That is, the communication path 460 can be a network connection. Examples of such a network connection can include local area network (LAN), wide area network (WAN), personal area network (PAN), and the Internet, among others. In such examples, the MRM 444 can be associated with a first computing device and the processing resource 440 can be associated with a second computing device, e.g., a Java® server. For example, a processing resource 440 can be in communication with a MRM 444, wherein the MRM 444 includes a set of instructions and wherein the processing resource 440 is designed to carry out the set of instructions.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for customer edge device problem identification comprising:
    obtaining a status of a connection between a provider edge (PE) device and a customer edge (CE) device;
    determining whether the status of the connection is non-normal;
    sending an internet control message protocol (ICMP) echo request to the CE device in response to the status of the connection being non-normal;
    receiving an ICMP echo response from the CE device;
    accessing a management information base (MIB) to identify whether a prefix of the CE device is reported to the MIB; and
    identifying a simple network management protocol (SNMP) problem that is associated with the CE device based upon the identified prefix and the receipt of the ICMP echo response.

2. The method of claim 1, wherein obtaining the status of the connection includes obtaining the status from the MIB that is associated with the CE device.

3. The method of claim 2, wherein obtaining the status of the connection includes examining a value of a bgpPeerState object identifier OID from the MIB.

4. The method of claim 1, wherein obtaining the status comprises identifying that the status is non-normal when a connection with the CE device cannot be established to obtain the status.

5. The method of claim 4, wherein the connection with the CE device cannot be established when an SNMP request is sent to the CE device and no SNMP response is received from the CE device.

6. A non-transitory machine-readable medium storing instructions for customer edge device problem identification executable by a computer to cause the computer to:
    obtain a status of a connection between a target customer edge (CE) device and an enterprise wherein the target CE device is part of the enterprise and is connected to the enterprise through an internet service provider (ISP);
    send an internet control message protocol (ICMP) echo request to the target CE device and identify that the status of the connection is non-normal; and
    determine that a problem exists based on whether one of a number of CE devices that are connected to the enterprise has received a target prefix for the target CE device in response to an ICMP echo response not being received from the target CE device and by accessing a management information base (MIB) that is associated with one of the number of CE devices.

7. The medium of claim 6, wherein the instructions executable to determine include instructions executable to:
    determine that the target CE device and the number of CE devices are connected to the enterprise through a number of associated provider edge (PE) devices, wherein the target CE device and the number of CE devices are physically located in a number of distributed sites;
    determine that each of the number of PE devices has an autonomous system (AS) number that has a same value; and
    determine that the target CE device and the number of CE devices are connected to the enterprise through the ISP based on the AS numbers with the same value.

8. The medium of claim 6, wherein the instructions executable to determine include instructions executable to:
    determine that the problem exists between a first provider edge (PE) device that connects the target CE device to the enterprise and a second PE device that connects the first PE device to the enterprise based on a determination that the one of the number of CE devices has received the target prefix.

9. The medium of claim 8, wherein the instructions are executable to obtain the target prefix from the at least one of the number of CE devices by accessing an ipCidrRouteDest object identifier OID from the MIB that is associated with the one of the number of CE devices.

10. The medium of claim 6, wherein the instructions executable to include instructions executable to:
    determine that the problem exists between a first provider edge (PE) device that connects the target CE device to the enterprise and a second PE device that connects the first PE device to the enterprise or that the problem exists in the target CE device based on a determination that the number of CE devices do not have the target prefix.

11. A system for customer edge device problem identification, comprising:

a processing resource in communication with a memory resource, wherein the memory resource includes a set of instructions, executable by the processing resource to:

obtain a status of a connection between a target customer edge (CE) device and an enterprise wherein the target CE device is part of the enterprise and is connected to the enterprise through an internet service provider (ISP);

send an internet control message protocol (ICMP) echo request to the target CE device and identify the status of the connection as non-normal; and determine, in response to an ICMP echo response not being received from the target CE device, that a problem exists based on whether any of a number of CE devices that are connected to the enterprise have received any prefixes that are associated with the number of CE devices, wherein the problem exists within at least one of:

one of the number of CE devices;

one of a number of provider edge (PE) devices;

a connection among the number of CE devices;

a connection among the number of PE devices; and a connection among any one of the number of CE devices and any one of the number of PE devices.

12. The system of claim 11, wherein the instructions executable to determine that the problem exists based on whether any prefixes are received by any of the number of CE devices that are connected to the enterprise include instructions executable to determine that the number of CE devices have not received a target prefix that is associated with the target CE device.

13. The system of claim 11, wherein the instructions are executable to determine that some prefixes are received by the number of CE devices by accessing an ipCidrRouteDest object identifier (OID) from a management information base (MIB) that is associated with the number of CE devices.

14. The system of claim 11, wherein the instructions are executable to determine that the problem exists between a first PE device that connects the target CE device to the enterprise and a second PE device that connects the first PE device to the enterprise based on a determination that some prefixes are received by the number of CE devices.

15. The system of claim 14, wherein the instructions are executable to:

determine that no prefixes are received by the number of CE devices; and determine that the target CE device is a hub based on a determination that no prefixes are received; and determine that the problem is in the hub based on the determination that no prefixes are received.

* * * * *